United States Patent
Hsieh

(10) Patent No.: US 8,655,083 B2
(45) Date of Patent: Feb. 18, 2014

(54) IMAGE PROCESSING SYSTEM AND IMAGE PROCESSING METHOD

(75) Inventor: Cheng-Yu Hsieh, Hsinchu County (TW)

(73) Assignee: Mstar Semiconductor, Inc., Hsinchu County (TW)

( * ) Notice: Subject to any disclaimer, the term of this patent is extended or adjusted under 35 U.S.C. 154(b) by 109 days.

(21) Appl. No.: 13/524,324

(22) Filed: Jun. 15, 2012

(65) Prior Publication Data

US 2013/0216140 A1 Aug. 22, 2013

(30) Foreign Application Priority Data

Feb. 21, 2012 (TW) ............................ 101105704 A

(51) Int. Cl.
*G06K 9/68* (2006.01)
(52) U.S. Cl.
USPC ........................................................ 382/218
(58) Field of Classification Search
USPC ........................................................ 382/218
See application file for complete search history.

(56) References Cited

U.S. PATENT DOCUMENTS

2009/0115863 A1* 5/2009 Lee .............................. 348/222.1
2012/0274740 A1* 11/2012 Yu et al. ........................... 348/43

OTHER PUBLICATIONS (Ron, Bigelow; "Batch Processing Raw Files in Photoshop"; http://www.ronbigelow.com, Feb. 2011).*

* cited by examiner

*Primary Examiner* — Samir Ahmed
*Assistant Examiner* — Totam Le
(74) *Attorney, Agent, or Firm* — WPAT, PC; Justin King

(57) ABSTRACT

An image processing system includes a difference detecting module for determining whether second image data is identical to first image data to generate a determination result, and an image processing module for processing the first image data to generate a first image processed result and selectively processing the second image data. The image processing module includes a data path and a control path. According to a reference clock signal, the first and second image data are transmitted via the data path, and the determination result is transmitted via the control path. When the determination result is affirmative, the reference clock signal provided to the data path is gated, so that, without processing the second image data, the image processing module outputs the first image processed result as a second image output corresponding to the second image data.

14 Claims, 6 Drawing Sheets

IMAGE PROCESSING SYSTEM AND IMAGE PROCESSING METHOD

This application claims the benefit of Taiwan application Serial No. 101105704, filed Feb. 21, 2012, the subject matter of which is incorporated herein by reference.

BACKGROUND OF THE INVENTION

1. Field of the Invention

The invention relates in general to an image processing technique, and more particularly, to an image processing technique for saving power consumption.

2. Description of the Related Art

With development of electronic techniques, portable electronic devices, such as tablet computers and smart phones, have become prevalent. Reducing power consumption and prolonging standby time are always important goals to manufacturers of portable electronic devices. In the recent years, carbon reduction and environmental protection awareness have gradually come into the spotlight, resulting in both immobile and portable electronic devices being expected to have lower power consumption and higher resource utilization efficiency.

SUMMARY OF THE INVENTION

The invention is directed to an image processing system and an image processing method. By avoiding repeated image processing performed on the same image data, the image processing system and the image processing method of the instant invention are capable of effectively reducing power consumption without undesirably affecting image quality.

According to one embodiment the present invention, an image processing system comprising a difference detecting module and an image processing module is provided. The difference detecting module determines whether second image data is identical to first image data to generate a determination result. The image processing module processes the first image data to generate a first image processed result, and selectively processes the second image data. The image processing module comprises a data path and a control path. According to a reference clock signal, the first image data and the second image data are sequentially transmitted via the data path, and the determination result is transmitted via the control path. When the determination result is affirmative, in an image processing period preserved for the second image data, the reference clock signal provided to the data path is gated in response to the determination result, so that, without processing the second image data, the image processing module outputs the first image processed result as a second image output corresponding to the second image data.

According to another embodiment of the present invention, an image processing method is provided. The method comprises steps of: performing image processing on first image data to generate a first image processed result; determining whether second image data is identical to the first image data to generate a determination result; and when the determination result is affirmative, gating a reference clock signal associated with image processing in an image processing period preserved for the second image data, so that, without processing the second image data, the first image processed result is output as a second image output corresponding to the second image data.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
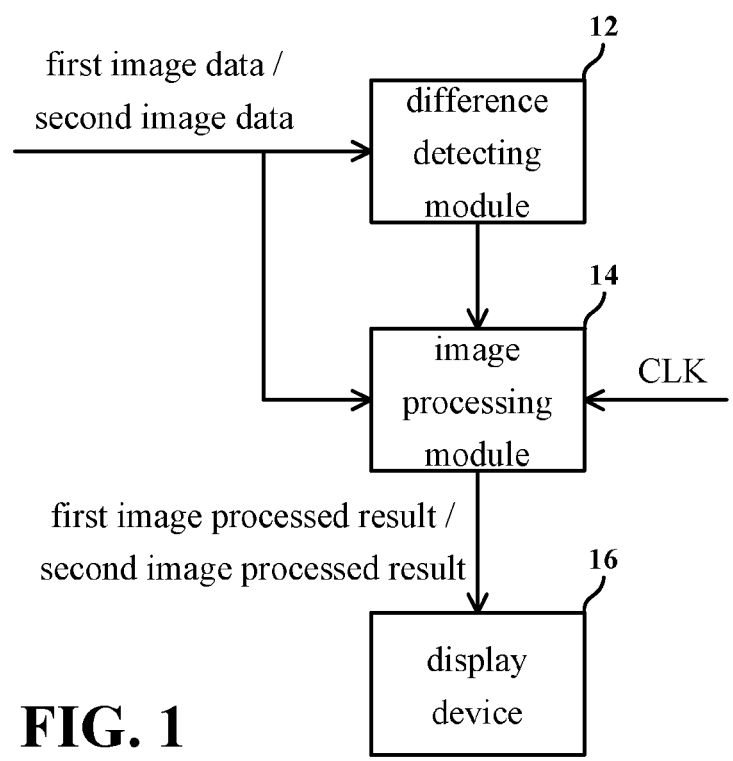
FIG. 1 is a block diagram of an image processing system according to one embodiment of the present invention.

FIG. 1 shows an image processing system 100 according to one embodiment of the present invention. The image processing system 100 comprises a difference detecting module 12, an image processing module 14, and a display device 16. It should be noted that the display device 16 is an optional component that can be provided independently outside the image processing system 100. In practice, the image processing system 100 can be integrated to a personal computer or a household/commercial multimedia system, or be included in a portable personal electronic device, e.g., as a display engine of a handheld device.

The difference detecting module 12 determines whether second image data is the same as first image data. Both the first image data and the second image data are associated with frames displayed by the display device 16. For example, the first image data and the second image data respectively correspond to two temporally successive frames, or are respectively two different image blocks corresponding to a same frame. Formats of the first image data and the second image data are not limited to a specific standard. Furthermore, the first image data and the second image data may be at the same time or sequentially transmitted to the difference detecting module 12. When arrival time of the first image data is earlier than that of the second image data, the difference detecting module 12 stores the first image data to a buffer to wait for the second image data, and starts to compare and determine whether the first and second image data are the same until then.

Referring to FIG. 1, the first image data and the second image data are also provided to the image processing module 14. The image processing module 14 first performs an image processing procedure on the first image data to generate a first image processed result. For example, the image processing procedure may include at least one of image pixel generation, image blending, gamma adjustment, backlight brightness adjustment, dithering, and data repacking. When arrival time of the first image data is earlier than that of the second image data, the image processing module 14 may perform the image processing procedure(s) on the first image data before the second image data arrives. It should be noted that, via the image processing procedure, the processing module 14 may selectively adjust the first image data, or generate a control signal according to the first image data for controlling a transmission parameter or a display parameter associated with the first image data.

In this embodiment, the first image processed result generated by the image processing module 14 is outputted to the display device 16 to serve as basis for the display device 16 to display images later. Taking backlight brightness adjustment as the image processing procedure as an example, the display parameter is the backlight brightness. The image processing module 14 selectively adjusts the grayscale value of each of the pixels of an image corresponding to the first image data, and correspondingly generates a control signal for adjusting the brightness of a backlight module (not shown) of the display device 16. Taking data repacking as the image processing procedure as an example, the transmission parameter is a packet characteristic. The image processing module 14 modifies the packet format, the size or the transmission sequence characteristic of the first image data to meet requirements of the display device 16. Of course, other parameters or characteristics may be used for a variety of differing processes, and is not at all limiting to the invention as a whole.

According to the determination result of the difference detecting module 12, the image processing module 14 determines whether to perform the same image processing procedure, previously performed on the first image data, on the second image data. When the difference detecting module 12 determines that the second image data is the same as the first image data, the image processing module 14 does not perform the image processing procedure on the second image data, but outputs the first image processed result instead, as a second image corresponding to the second image data. In practice, the image processing module 14 may include or connect to a buffer for temporarily storing the first image processed result. After the difference detecting module 12 determines that the second image data is the same as the first image data, the image processing module 14 directly fetches the first image processed result from the buffer and outputs the first image processed result as the second image output.

In this embodiment, when the difference detecting module 12 determines that the second image data is different from the first image data, the image processing module 14 continues to perform the image processing procedure on the second image data, i.e., the image processing module 14 generates a second image processed result according to the second image data. Similarly, the second image processed result is also temporarily stored in the image processing module 14. When subsequent third image data is the same as the second image data, the image processing unit 14 directly utilizes and outputs the second image processed result as a third image. For example, in the event that the first image data and the second image data correspond to different image blocks in different regions of a same webpage frame, the first image data and the second image data are much likely to be identical when the webpage frame has a large-area monochromatic background.

To achieve power saving, when the difference detecting module 12 determines that the second image data is the same as the first image data, in an image processing period preserved for the second image data, a reference clock signal CLK provided to the image processing module 14 is gated, such that the image processing module 14 stops performing the image processing procedure on the second image data. In one embodiment, an AND gate is configured at an input point where the image processing module 14 receives the reference clock signal CLK. One input signal of the AND gate is the reference clock signal CLK, and the other input signal relates to the determination result of the difference detecting module 12. Only when the difference detecting module 12 determines that the second image data is different from the first image data, the reference clock signal CLK is provided to the image processing module 14. When the reference clock signal CLK is gated, a circuit in the image processing module 14 operating according to the reference clock signal CLK stops performing image processing.

In one embodiment, the image processing module 14 comprises a data path and a control path. The first image data and the second image data are transmitted via the data path, with the reference clock signal also being provided to the data path to control a transmission timing of the image data. The determination result generated by the difference detecting module 12 and the control signal are transmitted via the control path. When the difference detecting module 12 determines that the second image data is the same as the first image data, in an image processing period preserved for process the second image data, the reference clock signal provided to the data path is gated to equivalently suspend the operation of a data processing circuit in the image processing module 14. The above approach offers an advantage that an external circuit is allowed to continue controlling the image processing module 14 via the control path by powering the control path with a minimal amount of electric power.

Figure 2:
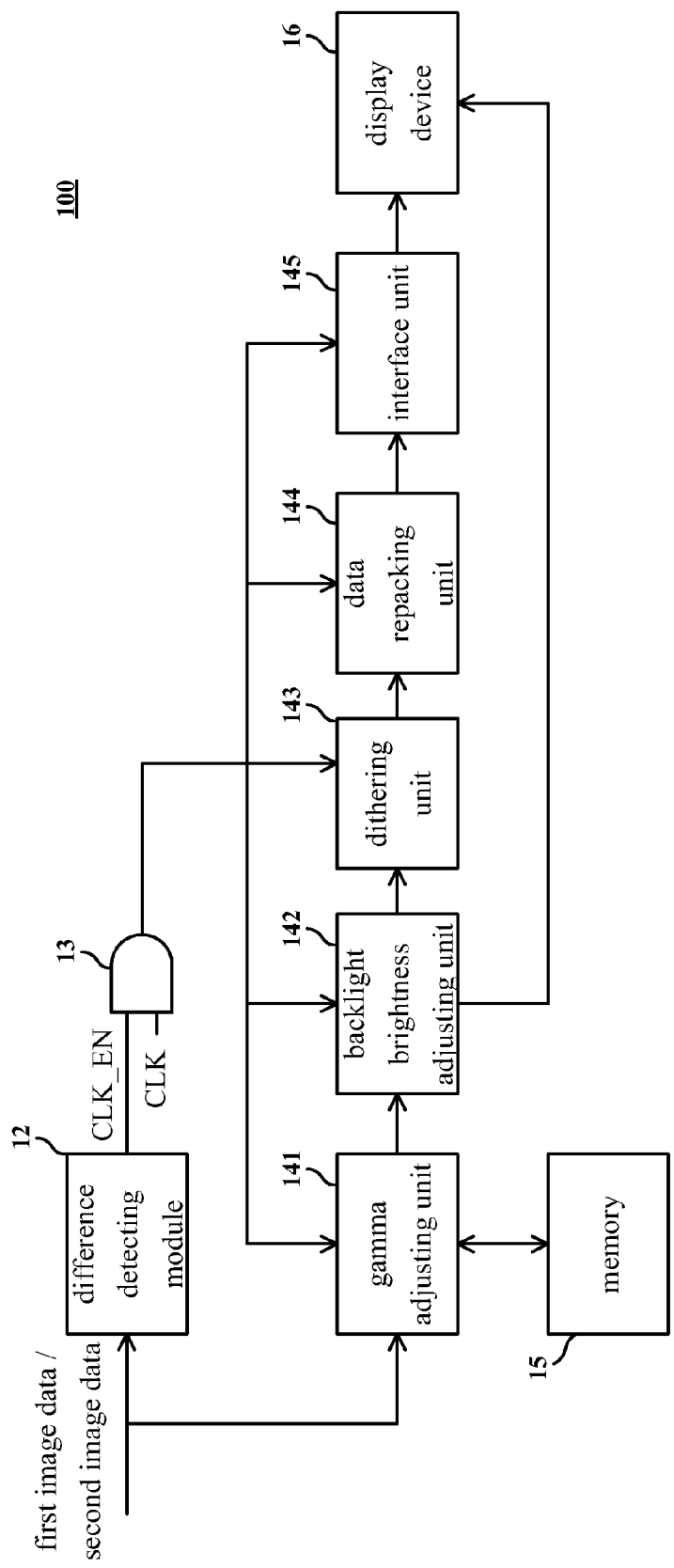
FIGS. 2 to 5 are detailed diagrams of an image processing module according to different embodiments of the present invention.

FIG. 2 shows a detailed diagram of the image processing module 14 according to one embodiment. In this embodiment, the image processing module 14 comprises a plurality of image processing units: a gamma adjusting unit 141, a backlight adjusting unit 142, a dithering unit 143, a data repacking unit 144, and an interface unit 145. The image processing units 141 to 145 respectively perform image processing sub-procedures on the first image data. Details of the image processing sub-procedures performed by the image processing unit are known as prior art and shall be omitted herein.

Referring to FIG. 2, the determination result generated by the difference detecting module 12 may be a flag signal, which serves as a clock enable signal CLK_EN and is inputted to an AND gate 13 with the reference clock signal CLK. When the difference detecting module 12 determines that the second image data is different from the first image data, the clock enable signal CLK_EN has a high level (logical 1) such that the reference clock signal CLK passes the AND gate 13 to be further transmitted to the image processing units 141 to 145. When the difference detecting module 12 determines that the second image data is the same as the first image data, the clock enable signal CLK_EN has a low level (logical 0) and thus an output signal of the AND gate 13 is fixed to a low level, such that the reference clock signal CLK cannot pass the AND gate 13 to equivalently gate the reference clock signal CLK, which serves as operation basis of the image processing units 141 to 145. At this point, the image processing units 141 to 145 respectively utilize and output the first image processed result previously generated according to the first image as the second image output. In this embodiment, the first image processed result and the second image processed result include image data and control data (e.g., a brightness control signal generated by the backlight brightness adjusting unit 142) provided from the interface unit 145 to the display device 16.

With respect to the circuit structure in FIG. 2, when the second image data is identical to the first image data, the image processing sub-procedures are not repeatedly performed on the second image data to reduce power consumption. The saved power consumption includes power consumption for gamma adjustment, power consumption for the gamma adjusting unit 141 to access a memory 15, power consumption for backlight adjustment, power consumption for dithering, power consumption for data repacking, and power consumption for the interface unit 145 to update output image data. It is proved by simulations and experiments that, compared to the prior art that performs image processing for all image data, the image processing system 100 of the present invention saves a certain amount of electric power. It should be noted that, the solution provided by the present invention is capable of achieving power saving without downgrading image quality.

Figure 3:
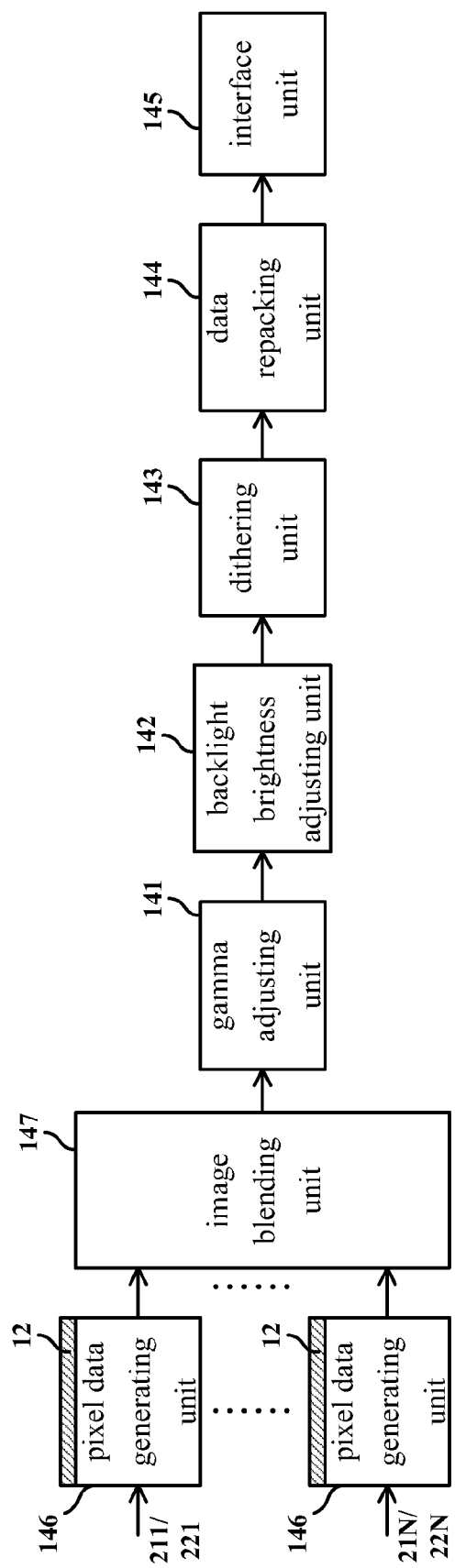

FIG. 3 shows a detailed block diagram of the image processing unit 14 according to another embodiment of the present invention. In this embodiment, a plurality of sub image data 211 to 21N, each corresponding to a display region, are respectively inputted to different pixel data generating units 146. An image blending unit 147 blends outputs of the pixel data generating units 146 into first image data. In one embodiment, each sub image data is image information of a window of an executing application program, and the first image data corresponds to a complete frame. The pixel data generating units 146 convert sub image data originally in other formats to information in a unit of pixels, and output the converted information to the image blending unit 147. Please note that the output of one pixel data generating unit 146 may not contain the complete image information of one pixel. For example, the output of one pixel data generating unit 146 corresponds to one of red, green, blue, and grayscale values, or one of luma, chroma, or saturation values.

Similarly, a plurality of sub image data 221 to 22N corresponding to a display region are respectively inputted to different pixel data generating units 146. The image blending unit 147 blends the outputs of the pixel data generating units 146 into second image data. In the embodiment in FIG. 3, each of the pixel data generating unit 146 coordinates with a difference detecting module 12. For example, the difference detecting module 12, coordinating with the pixel data generating unit 146 receiving the sub image data 211, determines whether pixel data generated according to the sub image data 221 is the same as the pixel data previously generated according to the sub image data 211. In this embodiment, only when all determination results of the difference detecting modules 12 corresponding to the image data generating units 146 are affirmative, i.e., the determination results are all logical 1, the image processing units 141 to 145 and 147 do not perform the image processing procedure on the second image data. In another embodiment, the difference detecting module 12 directly compares whether the sub image data 221 is the same as the sub image data 211.

Figure 4:
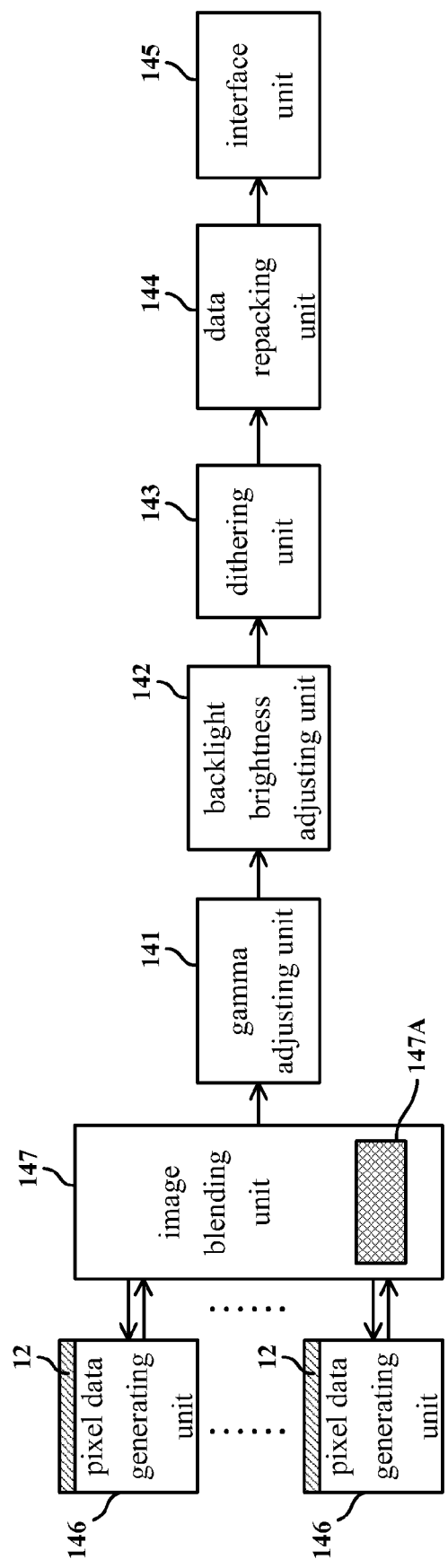

FIG. 4 shows a detailed block diagram of the image processing module 14 according to another embodiment. In this embodiment, the image blending unit 147 comprises a shielding determination unit 147A. As previously described, the sub image data 211 to 21N respectively correspond to different display regions. Taking each sub image data as image information of a window of an executing application program, for example, it is possible that one or more of the windows are shielded by another window when located at a lower layer of the image and are thus not displayed by the display device 16. The shielding determination unit 147A determines whether one or more lower-layer regions are shielded by another display region and are thus not displayed. When a determination result of the shielding determination unit 147A is affirmative, the shielding determination unit 147A informs the image processing module 14 to suspend from performing the image processing procedure on the sub image data corresponding to the lower-layer region. In this embodiment, the shielding determination unit 147A informs the pixel data generating unit 146 in charge of processing the sub image data to suspend generating the pixel data corresponding to the lower-layer regions, thereby achieving power saving. Similarly, this suspension effect can also be achieved by gating the reference clock signal provided to the pixel data generating unit 146.

It should be noted that, for other display regions that are not completed shielded (i.e., regions forming the frame of the display device 16), the image processing module 14 continues performing the predetermined image processing procedure.

Figure 5:
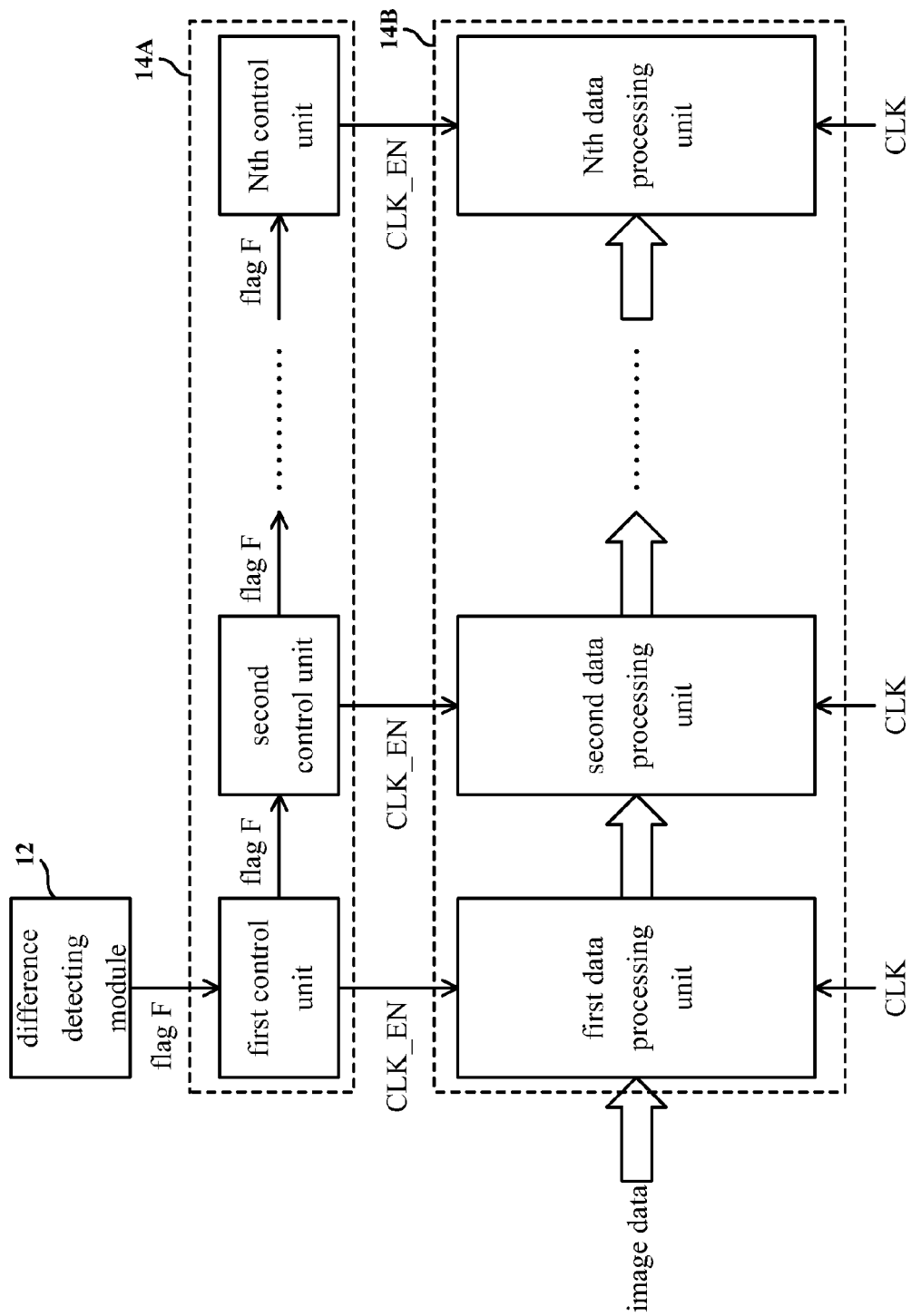

FIG. 5 shows a schematic diagram of a circuit structure implementing the above concept according to an embodiment of the present invention. In this embodiment, the image processing units in the image processing module 14 are serially connected in a pipeline structure, with each of the image processing units comprising a control unit and a data processing unit. Referring to FIG. 5, the control units (a first control unit to an $N^{th}$ control unit) may be regarded as a control path 14A, and the data processing units (a first data processing unit to an $N^{th}$ data processing unit) may be regarded as a data path. The data path 14B is for transmitting and processing image data, and the control path 14A is for transmitting and processing control signals other than image data.

In this embodiment, the difference detecting module 12 is connected to the frontmost first control unit in the pipeline structure, and a determination result is indicated by a flag F. For example, when the difference detecting module 12 determines that current image data is the same as previous image data, a value of the flag F is set to 0, or else the value of the flag F is set to 1.

According to the concept of the pipeline structure, the image processing units process successive data in a synchronized fashion. For example, as the second data processing unit performs backlight adjustment on the first image data, the first data processing unit may perform gamma adjustment on the second image data. The determination result (i.e., the flag F corresponding to the second image data) generated by the difference detecting module 12 after comparing the second image data with the first image data is sequentially passed on to a rear end along with the second image data. More specifically, when the second image data is passed on to the rear end by the first data processing unit, the flag F corresponding to the second image data is simultaneously passed on to the rear end by the first control unit to the second control unit.

When the second control unit finds that the flag F corresponding to the second image data is 0, the second control unit turns off/gates the reference clock signal CLK in the second data processing unit through the first clock enable signal CLK_EN. Meanwhile, the second data processing unit directly utilizes and outputs the processed result (temporarily stored in the second processing unit) generated according to the first image data as the second image data. The circuit structure in FIG. 5 differs from that shown in FIG. 2 in that, the image processing unit of each stage has an independent clock enable signal CLK_EN. The design of disposing the difference detecting module 12 at the frontmost of the pipeline structure eliminates the complication of providing the change detecting module for the image processing unit of each stage. It should be noted that, apart from the flag F, other control signals may also be transmitted sequentially among the control units.

Figure 6:
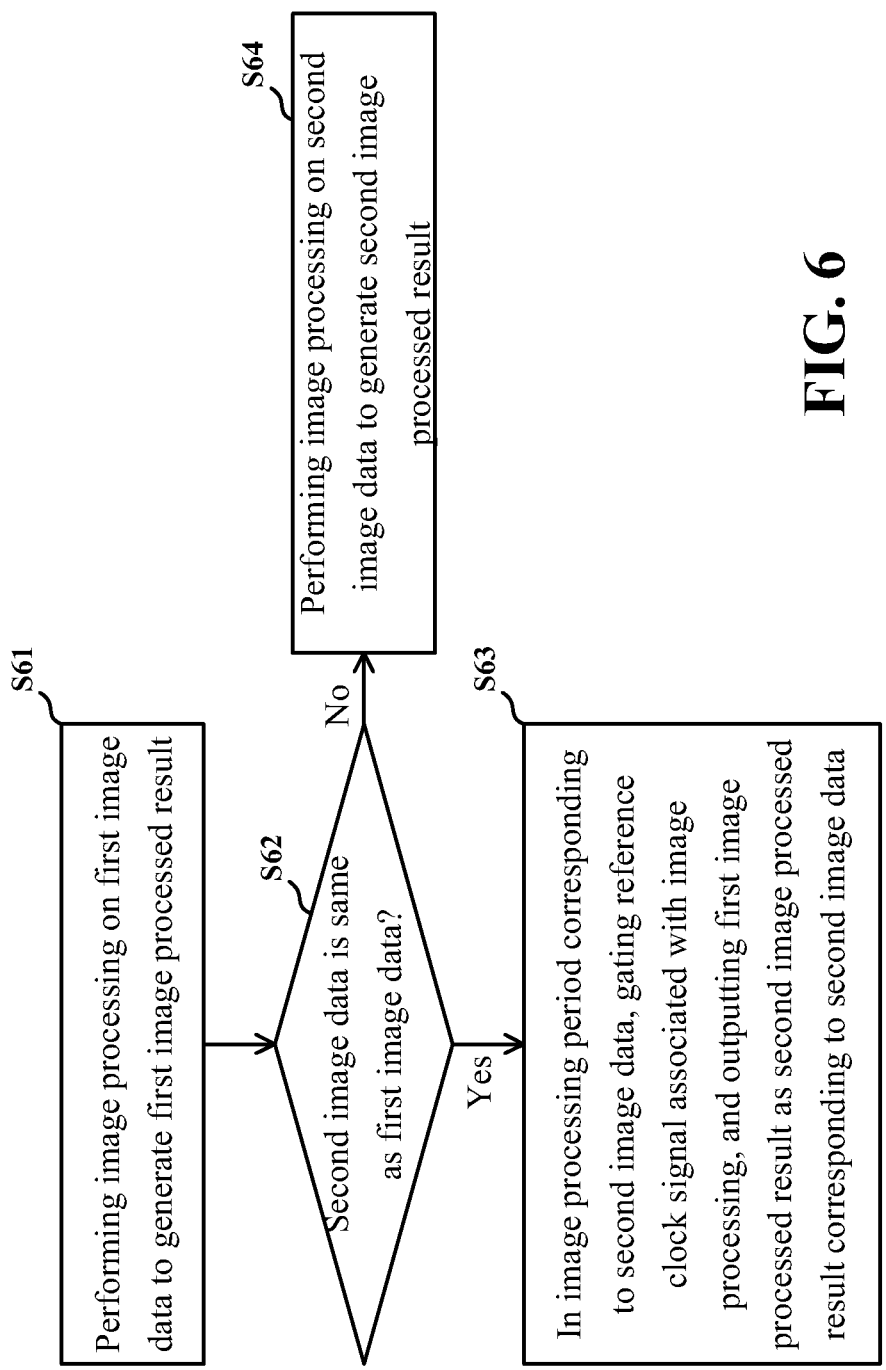
FIG. 6 is a flowchart of an image processing method according to one embodiment of the present invention.

FIG. 6 shows an image processing method according to another embodiment of the present invention. In Step S61, an image processing procedure is performed on first image data to generate a first image processed result (as a first image output). In Step S62, it is determined whether second image data is the same as the first image data. When a determination result of Step S62 is affirmative, Step S63 is performed. In Step S63, in an image processing period preserved for the second image data, a reference clock signal associated with the image processing procedure is gated, and thus the first image processed result is outputted as a second image output corresponding to the second image data. Conversely, when the determination result of Step S62 is negative, Step S64 is performed. In Step S64, the image processing procedure is performed on the second image data to generate a second image processed result to be outputted as the second image output.

Alternatively, Step S62 can be performed before Step S61 is ended. As previously described, the image processing procedure may be selectively adjusting the first image data, or generating a control signal according to the first image data. For example, the image processing procedure includes at least one of the image pixel generation, the image blending, the gamma adjustment, the backlight brightness adjustment, the dithering and the data repacking.

The concept demonstrated in FIG. 4 is also applicable to the image processing method of the invention. More specifically, when the first image data comprises a plurality of sub image data corresponding to a display region, the image processing method further comprises a determination step before Step S61. In the determination step, it is determined whether a lower-layer region is shielded by another display region and is thus not displayed. When a determination result of the determination step is affirmative, the method suspends the image processing procedure performed on the sub image data corresponding to the lower-layer region.

Further, as the concept demonstrated in FIG. 5, the image processing procedure may include a plurality of image processing sub-procedures arranged in a pipeline schedule, and the determination result of Step S62 is sequentially transmitted with the second image data in the pipeline structure.

With the above embodiments of the present invention, an image processing system and an image processing method are disclosed. By avoiding repeated image processing performed on same image data, the image processing system and the image processing method of the invention are capable of effectively reducing power consumption without downgrading image quality.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An image processing system, comprising:
a difference detecting module, for determining whether second image data is identical to first image data to generate a determination result, wherein the first image data comprising a plurality of sub image data, each corresponding to a display region;
an image processing module, for processing the first image data to generate a first image processed result and selectively processing the second image data;
the image processing module comprising a data path and a control path; and
a shielding determination unit, for determining whether a lower-layer region is completely shielded by other display regions;
wherein, according to a reference clock signal, the first image data and the second image data are sequentially transmitted via the data path, and the determination result is transmitted via the control path, and, when the determination result is affirmative, in an image processing period preserved for the second image data, the reference clock signal provided to the data path is gated in response to the determination result, so that, without processing the second image data, the image processing module outputs the first image processed result as a second image output corresponding to the second image data; and
wherein, when a determination result of the shielding determination unit is affirmative, the shielding determination unit informs the image processing module to suspend processing the sub image data corresponding to the lower-layer region.

2. The system according to claim 1, wherein when the determination result is negative, the image processing module processes the second image data to output a second image processed result as the second image output.

3. The system according to claim 1, wherein the image processing module selectively adjusts the first image data, or generates a control signal according to the first image data to control at least one of a transmission parameter and a display parameter associated with the first image data.

4. The system according to claim 1, wherein the image processing module comprises a plurality of image processing units for respectively performing an image processing sub-procedure on the first image data.

5. The system according to claim 4, wherein the image processing units are serially connected in a pipeline structure, and the determination result is a flag, which is sequentially transmitted with the second image data among the image processing units.

6. The system according to claim 1, wherein the image processing module processes at least one of image pixel generation, image blending, gamma adjustment, backlight brightness adjustment, dithering, and data repacking.

7. The system according to claim 1, the first image data comprising a plurality of sub image data, each corresponding to a display region, the system further comprising:
a shielding determination unit, for determining whether a lower-layer region is completely shielded by other display regions;
wherein, when a determination result of the shielding determination unit is affirmative, the shielding determination unit informs the image processing module to suspend processing the sub image data corresponding to the lower-layer region.

8. An image processing method, comprising:
processing first image data to generate a first image processed result by an image processing module, wherein the first image data comprising a plurality of sub image data, each corresponding to a display region;
determining whether second image data is identical to the first image data to generate a determination result;
gating a reference clock signal, so that, without processing the second image data, the first image processed result is output as a second image output corresponding to the second image data when the determination result is affirmative, in an image processing time period preserved for the second image data;
determining whether a lower-layer region is completely shielded by other display regions by a shielding determination unit; and
suspending the image processing module from processing the sub image data corresponding to the lower-layer region when the lower-layer region is completely shielded by other display regions.

9. The method according to claim 8, further comprising:
processing the second image data to output a second image processed result as the second image output when the determination result of determining whether second image data is identical to the first image data is negative.

10. The method according to claim 8, wherein processing the first image data comprises selectively adjusting the first image data, or generating a control signal according to the first image data to control at least one of a transmission parameter and a display parameter associated with the first image data.

11. The method according to claim 8, wherein processing the first image data comprises performing a plurality of image processing sub-procedures performed in a pipeline structure, the determination result is a flag, and the second image data is sequentially transmitted with the second image data in the pipeline structure.

12. The method according to claim 8, wherein processing the first image data processes at least one of image pixel generation, image blending, gamma adjustment, backlight brightness adjustment, dithering, and data repacking.

13. The method according to claim 8, wherein the first image data comprises a first sub image data corresponding to a first display region and a second sub image data corresponding to a second display region, the method further comprising:
 determining whether a lower-layer region is completely shielded by other display regions; and
 suspending processing of the sub image data corresponding to the lower-layer region when a determination result of whether a lower-layer region is completely shielded by other display regions is affirmative.

14. The method according to claim 8, wherein the first image data comprises a first sub image data and a second sub image data, and both the first sub image data and the second sub image data corresponding to a first display region;
 determining whether a lower-layer region is completely shielded by other display regions; and
 suspending processing of the sub image data corresponding to the lower-layer region when a determination result of whether a lower-layer region is completely shielded by other display regions is affirmative.

* * * * *